United States Patent [19]

Wheeler et al.

[11] Patent Number: 5,047,530

[45] Date of Patent: * Sep. 10, 1991

[54] ARYLENEDIAMINE SUBSTITUTED TRIAZINES

[75] Inventors: Edward L. Wheeler, Watertown; Franklin H. Barrows, Naugatuck; Robert J. Franko, Beacon Falls; Wadim Batorewicz, New Haven, all of Conn.

[73] Assignee: Uniroyal Chemical Company, Inc., Middlebury, Conn.

[*] Notice: The portion of the term of this patent subsequent to Nov. 20, 2007 has been disclaimed.

[21] Appl. No.: 254,005

[22] Filed: Oct. 5, 1988

Related U.S. Application Data

[62] Division of Ser. No. 90,298, Aug. 28, 1987, Pat. No. 4,794,135.

[51] Int. Cl.$^5$ .................................................. C07D 251/70
[52] U.S. Cl. ......................................................... 544/197
[58] Field of Search ............................................ 544/197

[56] References Cited

U.S. PATENT DOCUMENTS

| | | | |
|---|---|---|---|
| Re. 19,654 | 7/1935 | Reed | 524/100 |
| 2,909,421 | 10/1959 | Gysin | 544/197 |
| 3,156,690 | 11/1964 | Dexter et al. | 544/197 |
| 3,179,718 | 4/1965 | Wei et al. | 260/889 |
| 3,202,681 | 8/1965 | Dexter et al. | 524/100 |
| 3,205,193 | 9/1965 | Dexter et al. | 524/100 |
| 3,255,191 | 6/1966 | Dexter et al. | 524/100 |
| 3,257,354 | 6/1966 | Dexter et al. | 544/197 |
| 3,350,449 | 10/1967 | Wheeler et al. | 260/576 |
| 3,379,676 | 4/1968 | Ashton et al. | 260/45.8 |
| 3,414,570 | 12/1968 | Coburn | 544/197 |
| 3,419,639 | 4/1968 | Gentile | 260/889 |
| 3,630,974 | 12/1972 | Ladocsi et al. | 260/889 |
| 3,706,819 | 12/1972 | Usamoto et al. | 260/889 |
| 3,828,002 | 8/1974 | Westlinning | 524/100 |
| 3,830,274 | 8/1974 | Waser, Jr. | |
| 3,915,907 | 10/1975 | Hopper | |
| 3,937,862 | 2/1976 | Dillenschneider | |
| 4,003,420 | 1/1977 | Sandstrom et al. | |
| 4,479,008 | 10/1984 | Batorewicz et al. | 564/433 |
| 4,518,803 | 5/1985 | Batorewicz et al. | 564/410 |
| 4,617,390 | 10/1986 | Hoppe et al. | 544/197 |
| 4,645,793 | 2/1987 | Von Hellens et al. | |
| 4,650,867 | 3/1987 | Ronco et al. | 544/197 |
| 4,786,672 | 11/1988 | Wehner | 524/100 |

FOREIGN PATENT DOCUMENTS

| | | | |
|---|---|---|---|
| 8105752 | 7/1982 | Netherlands | 524/100 |
| 922040 | 3/1963 | United Kingdom | 524/100 |

OTHER PUBLICATIONS

Chem. Abs., vol. 105, No. 10, 8.9.86, p. 74, Abstract No. 80387f.

Primary Examiner—Kriellion S. Morgan
Attorney, Agent, or Firm—Raymond D. Thompson

[57] ABSTRACT

Disclosed are novel tris(N-alkyl-p-phenylenediamino)-1,3,5-triazine compounds useful as antiozonants for unsaturated high polymers. The compounds may be prepared by reacting N-alkylphenylenediamine with a cyanuric halide.

13 Claims, No Drawings

ARYLENEDIAMINE SUBSTITUTED TRIAZINES

This is a division of application Ser. No. 090,298, filed 08/28/87 now U.S. Pat. No. 4,974,135.

BACKGROUND OF THE INVENTION

This invention relates to new triazine compounds which are useful as antiozonants for rubber, processes for their manufacture, and to their use in inhibiting the deteriorating effect of ozone on unsaturated polymers.

It is well known that ozone causes surface cracking of conventional highly unsaturated rubber vulcanizates when the rubber is placed under strain in an ozone environment. The most severe deterioration occurs when a small number of cracks are formed which grow rapidly into deep, disruptive fissures. These ozone cracks seriously shorten the serviceable life of the article.

Chemical antiozonants have been developed which retard the formation of the ozone cracks occuring under static and dynamic conditions. Examples of antiozonants in common use include: N-phenyl-N'-(1,3-dimethylbutyl)-p-phenylenediamine: N-phenyl-N'-isopropyl-p-phenylenediamine: N-phenyl-N'-(1,4-dimethylpentyl)-p-phenylenediamine; N-phenyl-N'-(1-methylheptyl)-p-phenylenediamine N-phenyl-N'-cyclohexyl-p-phenylenediamine; mixed diaryl-p-phenylenediamines; N,N'-diphenyl-p-phenylenediamine; N,N'-di-beta-naphthyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N-phenyl-N'-p-toluenesulfonyl-p-phenylenediamine and blends of these materials.

The use of these well known paraphenylenediamine materials has improved ozone protection under both static and dynamic conditions, however, even the best of the class just described have a very strong tendency to both stain and discolor. The term "stain" or "staining" is herein used to describe the characteristic of a material to diffuse through a polymeric substrate and discolor the adjacent surface. This diffusion staining is highly objectionable in most light colored rubber articles. In tires, which is the largest application in which the ozone protection is required, the tendency to diffusion staining of the aforementioned paraphenylenediamine materials is objectionable particularly in white sidewall type tires. Even in non-white sidewall type tires, the tendency of the materials to diffuse to the surface of the tire sidewall can be objectionable in that a brown, dull surface is created on the tire sidewall. This is aesthetically objectionable in that it detracts from the general jet black, smooth appearance of a new tire. It is obvious that in a white sidewall tire, the migration of the brown discoloring material to the surface of the white sidewall is highly objectionable and generally difficult to remove during cleaning of the tire surface.

Waxes have been long utilized to inhibit ozone cracking in articles under stress in static condition by vulcanization. The wax functions by migrating to the surface of the rubber article to form a film which acts as a physical barrier to the ozone attack. However, during dynamic flexing in service, the wax film is cracked or disrupted and the tendency is for the article to exhibit fewer and more severe ozone cracks than if no wax had been incorporated. Therefore, for many service conditions, the use of wax is impractical due to the dynamic conditions under which the article is expected to perform.

An object of this invention is to provide an antiozonant material which is highly effective in protecting a highly unsaturated polymer substrate from ozone attack. A further object is to provide ozone protection in a static condition at very low levels and to protect the rubber article during extended aging conditions against ozone attack. Yet another object is to produce a compound which does slowly diffuse and does not produce an objectionable brown bloom.

The novel arylenediamine substituted triazine compounds of the invention have provided exceptional long term ozone protection under static conditions without using wax. An advantage of the substituted triazine compounds is that it produces a substantially non-staining antiozonant of high molecular weight. A further advantage is that it slowly blooms to the surface of the rubber article. A further advantage is that the triazine compounds of the invention provide outstanding dynamic protection without the use of waxes preferably by blending said triazine compounds with other known antiozonants and antioxidants. Another advantage is that the compounds do not tend to increase scorchiness of the compounded rubber stock in which it is used. This improves processing safety over other paraphenylenediamine antiozonants.

BRIEF DESCRIPTION OF THE INVENTION

The object and advantages of the invention may be obtained using a compound of the general formula:

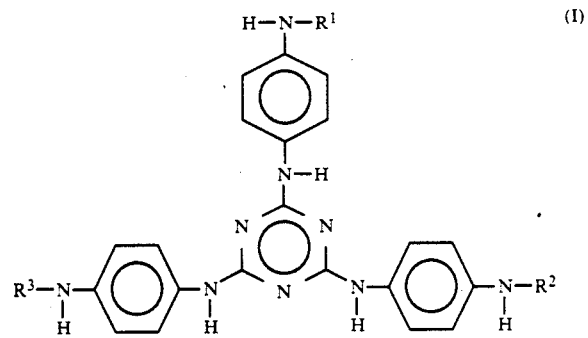

in which $R^1$, $R^2$ and $R^3$ are radicals independently selected from a $C_3$–$C_{18}$ branched or linear alkyl, or a $C_3$–$C_{12}$ cycloalkyl or a $C_3$–$C_{12}$ cycloalkyl substituted with one or more $C_1$–$C_{12}$ alkyl groups.

The novel compounds of the present invention may be prepared by A process comprising:

reacting an N-alkyl-p-phenylenediamine with a trihalotriazine in a solvent to form a reaction mixture including a 2,4,6-tris(N-alkyl-p-phenylenediamino)-1,3,5-triazine trihydrohalide: and neutralizing said 2,4,6-tris(N-alkyl-p-phenylenediamino)-1,3,5-triazine trihydrohalide with a base to form a 2,4,6-tris(N-alkyl-p-phenylenediamino)-1,3,5-triazine.

Unsaturated polymers may be stabilized against ozone degradation by incorporation therein of an effective amount the novel compounds of structure (I).

DETAILED DESCRIPTION OF THE INVENTION

Referring now to structure (I), the preferred compositions are those in which $R^1$, $R^2$ and $R^3$ are linear or branched $C_3$–$C_{18}$ alkyl groups. The alkyl groups more preferred are those with a secondary carbon in the alpha position to the nitrogen. In this configuration, the antiozonant activity of the compound is believed to be enhanced. Therefore, the more preferred alkyl groups are branched chains which provide an alkyl substituent which is in accordance with this configuration. The cycloalkyl or $C_1$–$C_{12}$ alkyl substituted cycloalkyls provide such a alpha carbon configuration as well. The structure of formula I which is most preferred at this time are compounds in which $R^1$, $R^2$ and $R^3$ are $C_6$–$C_8$ branched chain alkyl groups. Examples of some preferred chemicals of the present invention are: 2,4,6-tris(N-1,4-dimethylpentyl-p-phenylenediamino)-1,3,-5-triazine; 2,4,6-tris(N-isopropyl-p-phenylenediamino)-1,3,5-triazine; 2,4,6-tris(N-cyclohexyl-p-phenylenediamino)-1,3,5-triazine; 2,4,6-tris(N-sec-butyl-p-phenylenediamino)-1,3,5-triazine; 2,4,6-tris(N-1,3-dimethylbutyl-p-phenylenediamino)-1,3,5-trazine: 2,4,6-tris(N-1-methylheptyl-p-phenylenediamino)-1,3,5-triazine: 2,4,6-tris(N-2,4-di-tert-butylcyclohexyl-p-phenylenediamino)-1,3,5-triazine; 2,4,6-tris(N-2-sec-butylcyclohexyl-p-phenylenediamino)-1,3,5-triazine, 2,4,6-tris(1-methyldecyl-p-phenylenediamine)-1,3,5-triazine. The most preferred material 2,4,6-tris(N-1,4-dimethylpentyl-p-phenylenediamino)-1,3,5-triazine.

The compounds of the invention can be synthesized advantageously by the following general method. Although the reagents may be added in different order as shown in some of the examples, the preferred method is as follows:

The N-alkyl-p-phenylenediamine, which is prepared by methods known to those familiar with the art, is reacted with 2,4,6-tri-halogeno-1,3,5-triazine. A molar equivalent of the preferred tri-halo triazine commonly called cyanuric chloride is added as a powder to a solution of three plus moles of the N-alkyl-p-phenylenediamine in a suitable solvent such as isopropanol, at ambient temperatures with appropriate cooling. The first two halogen atoms are displaced rapidly. The reaction mixture is then heated to 60°–80° C. in order to complete the displacement of the third halogen atom. After 4-5 hours heating at 60°–80° C. the formation of the 2,4,6-tris-(N-alkyl-p-phenylenediamino)-1,3,5-triazine trihydrochloride is complete.

The process is unique in that the basicity of the alkyl-p-phenylenediamine allows the displaced halogen atom of the cyanuric halide to form the hydrohalide directly thereby enabling isolation of the trihalide and effecting a purification step.

The tris-hydrochloride may be removed by filtration, then reslurried in a suitable water miscible solvent, neutralized with aqueous base such as sodium hydroxide, and crystallized from the aqueous solvent mixture.

If the starting N-alkyl-p-phenylenediamine is sufficiently pure, or a less pure product is acceptable, isolation of the tris-hydrochloride is not necessary, and the reaction mixture can be neutralized and the product crystallized and isolated by filtration.

Temperature control of the reaction is of some importance. It is preferred that the first stage of the reaction take place below 30° C. and that the second stage take place at least 30° C. above the first stage. Selection of the optimal temperatures are, of course, dependent upon the identity of the p-phenylenediamine and solvent which is chosen.

Preferred solvents are alcohols although any suitable solvent may be utilized. The term solvent is meant to include an excess of the N-alkyl-p-phenylenediamine which may serve to solvate the reaction product and allow subsequent isolation.

It is noted here that any use of the term "alkyl", in the context of a starting material (i.e., N-alkyl-p-phenylenediamine) or the final substituted triazine compounds of this invention, is deemed to include cycloalkyl and alkyl substituted cycloalkyl structures as well.

The compounds of the invention are most advantageously utilized as antiozonants to protect highly unsaturated polymers such as natural or synthetic elastomers. Representative of the highly unsaturated polymers which may be employed in the practice of this invention are diene elastomers. Such elastomers will typically possess an iodine number of between about 100 and about 250, although highly unsaturated rubbers having a higher or a lower (i.e., of 50–100) iodine number may also be employed. Illustrative of the diene elastomers which may be utilized are polymers based on conjugated dienes such as 1,3-butadiene: 2-methyl-1,3-butadiene; 1,3-pentadiene; 2,3-dimethyl-1,3-butadiene; and the like, as well as copolymers of such conjugated dienes with monomers such as styrene, alpha-methylstyrene, acrylonitrile, methacrylonitrile, methyl acrylate, ethyl acrylate, methyl methacrylate, ethyl methacrylate, vinyl acetate and the like. Preferred highly unsaturated rubbers include natural rubber, cis-polyisoprene polybutadiene, poly(styrene-butadiene), polychloroprene and poly(acrylonitrile-butadiene). Moreover, mixtures of two or more highly unsaturated rubbers may be employed. Also, mixtures of the highly unsaturated rubbers with elastomers having lesser unsaturation such as EPDM, EPR, butyl or halogenated butyl rubbers are also within the contemplation of the invention.

The novel compounds of the invention may be used in combination with other antiozonants and less preferably with microcrystalline waxes as are commonly used to protect against static ozone attack. The other antiozonants which may be utilized include any of the commonly recognized paraphenylenediamine class of materials: N-phenyl-N'-(1,3-dimethylbutyl)-p-phenylenediamine; N-phenyl-N'-isopropyl-p-phenylenediamine; N-phenyl-N'-(1-methylheptyl)-p-phenylenediamine; N-phenyl-N'-cyclohexyl-p-phenylenediamine; mixed diaryl-p-phenylenediamines; N,N'-diphenyl-p-phenylenediamine; N,N'-di-beta-naphthyl-p-phenylenediamine; N,N'-bis,(1,4-dimethylpentyl)-p-phenylenediamine; N,N"-bis(1-ethyl-3-methylpentyl)-p-phenylenediamine; N,N'-bis(1-methylheptyl)-p-phenylenediamine; N-phenyl-N'-p-toluenesulfonyl-p-phenylenediamine; N-phenyl-N'-alkyl-p-phenylenediamine: 6-ethoxy-1,2-dihydro-2,2,4-trimethylquinoline; and nickel dibutyl dithiocarbamate.

A most preferred antiozonant to be use in combination with the novel triazine compounds of the invention is N-phenyl-N'-(1,3-dimethylbutyl)-p-phenylenediamine.

The highly unsaturated polymers to be protected may be formulated in conventional manner with the many usual compounding ingredients, for example, vulcanizing agents, accelerators, activators, retarders, antiozonants, antioxidants, plasticizing oils and softeners, fillers, reinforcing pigments and carbon blacks.

The novel compounds of the invention may be added to a unsaturated polymer at a level of from 0.1 to about 10 parts by weight per hundred parts by weight of rubber hydrocarbon (hereinafter PHR). For these purposes the polymer is assumed to be a natural or synthetic rubber. A more preferred addition level is about 1 to about 6 parts PHR. The most preferred level is from about 2 to about 4 parts PHR. When the triazine compounds of the invention are used in combination with other antiozonants such as the paraphenylenediamine class of materials, they may be added in a blend which totals to the ranges set forth above. The compounds of the invention may be blended with the other antiozonants at ratios ranging from 1:3 to 3:1. More preferred is a ratio range of 2:3 to 3:2. These ratios are meant to indicate the percentages are 40:60 to 60:40 where in all cases the triazine compounds of the invention are the first number of each ratio. It should be noted that in certain applications and with certain other antiozonants, the PHR ranges of antiozonant listed above may be varied in order to obtain the optimal protection. Reasonable experimentation must be undertaken in order to optimize the ratios and overall levels of the blend when the triazine compounds of the invention are blended with other conventional antioxidants and antiozonants.

The novel triazine compounds of the invention may be synthesized by a suitable synthesis route. The following synthesis examples are provided to illustrate a currently preferred method of manufacturing certain of the class of triazine compounds of the invention.

SYNTHESIS EXAMPLES

EXAMPLE I:

2,4,6-tris(N-1,4-dimethylpentyl-p-phenplene diamino)-1,3,5-triazine

In a 3-liter, four-necked, round-bottomed flask equipped with a thermometer, a mechanical stirrer, a condenser, and a dropping funnel was placed 1500 ml of isopropanol. The ispropanol was cooled to $-10°$ C. and 184.4 grams (1 mole) of cyanuric chloride was added. To this stirred suspension was added 680 grams (3.3 moles) of 4-amino-N-(1,4 dimethylpentyl)aniline dropwise over 1 hour period keeping the temperature between $-10°$ and $-5°$ C. Over 1 hour the reaction mixture was warmed to 30° C. then held for 16 hours at 30° C. The reaction mixture was refluxed for 1 hour at about 80° C. The reaction was followed by high pressure liquid chromatograph by observing the disappearance of the starting amine, and the conversion of the intermediate mono- and bis- substituted compounds to the final tris-substituted product. After cooling to 60° C. 240 grams (3 moles) of 50 percent sodium hydroxide solution was added dropwise over 1 hour period. The sodium chloride was removed by filtration at 0° C. The filtrate was cooled to 10° C. and the solvent was decanted off. The oily lower layer was extracted with water at 60° C. then crystallized from fresh isopropanol. The title compound was recrystallized from hexane and it melted at 128°–132° C. The yield was 78.1 percent. The infrared spectrum was consistent with the structure. Relative area HPLC analysis of the product showed it to be 95.8 percent pure.

EXAMPLE 2:

2,4,6-tris(N-isopropyl-p-phenplenediamino)1,3,5-triazine

In a 2-liter, four-necked, round-bottomed flask equipped with a thermometer, a mechanical stirrer, a condenser, and a dropping funnel was placed 650,ml. of isopropanol. The isopropanol was cooled to $-5°$ C. and 36.8 grams (0.2 mole) of cyanuric chloride was added. To this stirred suspension was added a solution of 90 grams (0.6 mole) of 4-amino-N-isopropylaniline in 100 ml. of isopropanol dropwise over 1 hour period keeping the temperature between $-5°$ and 0° C. Over ½ hour the reaction mixture was warmed to 30° C. then refluxed for 2 hours. The reaction was followed by high pressure liquid chromatography by observing the disappearance of the starting amine, and the conversion of the intermediate mono- and bis-substituted compounds to the final tris-substituted product. The reaction mixture was cooled, and allowed to stand overnight. The amine hydrochloride salt was neutralized by adding 96 grams (0.6 mole) of 25 percent sodium hydroxide solution over ½ hour period, and then refluxing the mixture for ½ hour. The title compound precipitated upon cooling and was isolated by filtration, washed with isopropanol and hot water (60° C.), M.P. 196°–198° C. The yield was 75.2 percent. The infrared spectrum was consistent with the structure. Relative area HPLC analysis of the product showed it to be 95.3 percent pure.

EXAMPLE 3:

2,4,6-tris(N-cyclohexyl-p-phenylenediamino)-1,3,5-triazine

The procedure of Example 2 was repeated except on a 0.1 molar scale with 4-amino-N-cyclohexylaniline used to produce the title compound, M.P. 215°–217° C. The yield was 89.9 percent. The infrared spectrum was consistent with the structure. Relative area HPLC analysis of the product showed it to be 90.1 percent pure.

EXAMPLE 4:

2,4,6-tris(N-sec-butyl-p-phenylenediamino)-1,3,5-triazine

The procedure of Example 2 was repeated except that 4-amino-N-sec-butylaniline was used to produce the title compound, M.P. 167°–169° C. The yield was 90.8 percent. The infrared spectrum was consistent with the structure. Relative area HPLC analysis of the product showed it to be 94.6 percent pure.

EXAMPLE 5:

2,4,6-tris(N-1,3-dimethylbutyl-p-phenylene diamino)-1,3,5-trazine

In a 3-liter, four-necked, round-bottomed flask equipped with a thermometer, a mechanical stirrer, a condenser, and a powder funnel was placed a solution of 316.8 grams (1.65 moles) of 4-amino-N-(1,3 dimethylbutyl)aniline in 1500 ml of isopropanol. The temperature of the solution was adjusted to 30° C. and 92.2 grams (0.5 mole) of cyanuric chloride was added over ½ hour period keeping the temperature between 30° to 40° C. The reaction mixture was refluxed for 1½ hours. The reaction was followed by high pressure liquid chromatography by observing the disappearance of the starting amine, and the conversion of the intermediate mono- and bis-substituted compounds to the final tris-substituted product. After cooling the reaction mixture to 60° C. 120 grams (1.5 moles) of 50 percent sodium hydroxide solution was added dropwise over 1 hour period. The sodium chloride was removed by filtration at 40° C. The filtrate was charged back to the reaction flask, and 250 ml of water was added dropwise. The title compound precipitated, and was removed by filtration, M.P. 124°–127° C. The yield was 82.6 percent. The infrared spectrum was consistent with the structure.

Relative area HPLC analysis of the product showed it to be 95.3 percent pure.

EXAMPLE 6:

2,4,6-tris(N-1-methylheptyl-p-phenylenediamino)-1,3,5-triazine

The procedure of Example 5 was repeated except on a 225 molar scale with 4-amino-N-(1-methylheptyl)aniline used to produce the title compound. After recrystallization from a 28 percent toluene hexane mixture the melting point of the product was 87°–90° C. The infrared spectrum was consistent with the structure, and the relative area HPLC analysis of the product showed it to be 90.7 percent pure.

EXAMPLE 7:

2,4,6-tris(N-2,4-di-tert-butylcyclohexyl-p-phenylenediamino)-1,3,5-triazine

The procedure of Example 5 was repeated except on a 0.25 molar scale with 4-amino-N-(2,4-di-t-butylcyclohexyl)aniline used to produce the title compound, M.P. 147°–152° C. The yield was 85.7 percent. The infrared spectrum was consistent with the structure.

EXAMPLE 8:

2,4,6-tris(N-2-sec-butylcyclohexyl-p-phenylenediamino)-1,3,5-triazine

The procedure of Example 5 was repeated except on a 0.25 molar scale with 4-amino-N-(2-sec-butylcyclohexyl)aniline used to produce the title compound. The product didn't crystallize, and was isolated as a pot residue, M.P. 122°–130° C. The yield was 95.8 percent. The infra red spectrum was consistent with the structure, and the relative area HPLC analysis of the product showed it to be 86.6 percent pure.

ANTIOZONANT UTILITY EXAMPLES 9-24

The N-alkylarylenediamino triazine compounds of the invention function as outstanding antiozonants in rubber polymers with no migratory staining tendency evident at this time. The following examples demonstrate their utility in a variety of ozone and color stability test regimes. All tests utilize the triazines in vulcanized rubber compounds as are typical in the industry. The following test formulation is a typical rubber compound.

| TEST FORMULATION | |
|---|---|
| | Parts by Weight |
| Natural Rubber (SMR5CV) | 50.0 |
| Polybutadiene (cis 1,4 BR) | 50.0 |
| Carbon Black (N-326) | 50.0 |
| Zinc Oxide | 3.0 |
| Microcrystalline Wax | 1.5 |
| Stearic Acid | 1.0 |
| Aromatic Oil | 5.0 |
| Benzothiozole Sulfenamide | 1.0 |
| Sulfur | 2.0 |
| Antiozonant - Variable | Variable |

TABLE OF ANTIOZONANTS

Comparative A - N-phenyl-N'-(1,3-dimethylbutyl)-p-phenylenediamine (commercially available as Flexzone TM 7F from Uniroyal Chemical Company)

Comparative B - mixed diaryl -p-phenylenediamine (commercially available as Novazone TM AS from Uniroyal Chemical Company)

EXAMPLE 1

2,4,6-tris(N-1,4-dimethylpentyl-p-phenylenediamino)-1,3,5-triazine

The foregoing test formulation was used for all test samples unless otherwise noted. The formulation is an approximation of a typical tire sidewall compound. The identity and level of the antiozonant are the variables to be evaluated in the subsequent examples.

The test formulation was utilized to make uncured test sheets by preblending the natural rubber and polybutadiene. Once blending was accomplished, all other ingredients except the sulfur and benzothiazole sulfenamide were added to form a nonproductive compound and in a subsequent mixing step, the foregoing ingredients were added. Tests sheets for the subsequent testing were cured in a platen press between heated plates for a time sufficient to achieve full cure. For the purposes of testing, a fifteen minute cure at 160° C. was normally utilized. The exact sample configuration of the test specimens for the ozone testing varies by the description of the ASTM method utilized. Reference is made to the ASTM test methods and such methods are incorporated herein by reference to abbreviate the required descriptive information regarding specimen preparation, test methods and test results.

OZONE TEST RESULTS

Ozone testing was conducted utilizing the standard test method of ASTM D1149-81 which is titled Rubber Deterioration - Surface Zone Cracking in a Chamber (Flat Specimen). This method covers the estimation of the resistance of vulcanized rubber to cracking when exposed to an atmosphere containing ozone. Rubber specimens are kept under a surface tensile strain and the ozone content in the test chamber is maintained at a 50 part per hundred million level in a 100° F. (38° C.) test chamber. A common designation for this test is the bent loop test method since the test specimen is placed under strain by having it clamped in a looped configuration in which varying degrees of strain and elongation result. This bent loop configuration is an extremely severe test configuration in which failure can be expected in a relatively few hours given the high temperature and high ozone atmosphere in which the test samples are placed.

TABLE I

| STATIC OZONE TESTING (Results in Hours) | | | |
|---|---|---|---|
| | EXAMPLE # | | |
| ANTIOZONANT, 4 PHR OZONE BOX - STATIC TEST | 9 Blank | 10 Comparative A | 11 Example 1 |
| Unaged | | | |
| No Cracks | — | — | 1128 |
| Cracked | 6 | 600 | — |
| 6 Months Aged | | | |
| No Cracks | — | — | 1080 |
| Cracked | 8 | 24 | — |
| 12 Month Aged | | | |
| No Cracks | — | — | 1040 |
| Cracked | 17 | 40 | — |

The prepared specimens were aged unstressed at room temperature at six months and twelve months and tested. Accordingly, three sets of test data are presented: unaged, six month and twelve month aged. The Example 9 column headed by the term blank denotes a formulation which contains no antiozonant protection. That unprotected sample broke in between six and seventeen hours of exposure depending upon the degree of aging which the specimen underwent prior to ozone exposure. Example 10 with Comparative A is the result of the conventional paraphenylenediamine (Flexzone 7F) added at four parts PHR and it cracked between 600 and as low as 24 hours of exposure. In Example 11, the rubber formulation protected by the substituted triazine of the invention shown in Example 1 survived between 1040 and 1128 hours for the various unaged and aged samples. It is clear from these results that the ozone protection afforded by the compounds of this invention are outstanding compared to the conventional antiozonants which are well known in the rubber field.

Table II shows the data for static ozone testing conducted in a similar manner to the testing shown in Table I. Test specimens dumbells, 3 mm by 50 mm were stretched 20% on specially designed racks and the degree of cracking was periodically recorded. Under this method, the test sample is subjected to the ozone atmosphere of 50 parts per hundred million at 100° F. while under 20% elongation or extension. This additional degree of strain is a added characteristic of the sample preparation that is different than the test conducted as shown in Table I. All other details with respect to the test method are similar to those previously reported for the Table I results.

TABLE II

OZONE EXPOSURE 20% EXTENSION
(Results in Hours)

| | | EXAMPLE # | |
|---|---|---|---|
| ANTIOZO-NANT, 4 PHR | 12 BLANK | 13 COMPARATIVE A | 14 EXAMPLE 1 |
| Unaged | | | |
| No Cracks | — | 600* | 1128 |
| Cracked | 552 | — | |
| 6 Months Aged | | | |
| No Cracks | — | — | 1080 |
| Cracked | 8 | 24 | |
| 12 Month Aged | | | |
| No Cracks | — | — | 1040 |
| Cracked | 12 | 56 | — |

*Very slight cracking is visible

The unprotected blank test specimens of Example 12 survived between 12 and 552 hours depending on how long the sample was aged. The Comparative A composition when in an unaged condition at 600 hours showed very slight cracking. The six month and twelve month aged Example 13 showed cracking of the sample in between 56 and 24 hours. The compounds of this invention shown as example #14 again showed very dramatic improvements over the prior art antiozonant in providing protection which exceeded 1000 hours at these test conditions. This again demonstrates the superiority of the N-alkyl arylenediamino triazines of this invention over the conventionally used antiozonant of the paraphenylenediamine class.

Rubber articles must be protected against ozone when they are subjected to such exposure on outdoor weathering. One of the most difficult applications is on a tire where the vehicle remains out of doors and in ozone bearing atmosphere for an indefinite period of time. The true service conditions under which tires operate are not well duplicated by either static ozone tests such as those described in Table I and II nor are they well duplicated using dynamic test procedures such as DeMattia Flex Testing. In an effort to simulate a typical tire surface condition the following test method is utilized. In the testing scheme, samples are mounted in southern facing test fixtures outdoors, exposed to the full outdoor environmental conditions as are present in Naugatuck, Connecticut. The samples are continuously flexed for 8 hours over approximately a 78° angle. After this flexing period the sample is then relaxed and remains in that relaxed, static condition for 16 hours. This protocol is repeated day after day until the deterioration as evidenced by the appearance and growth of cracks on the sample surface is observed and recorded. This intermittent flex/relaxation test is felt to correlate well with the actual conditions under which a tire operates. That is, the tire is driven for a number of hours in which it is cycled to similar extensions as are accomplished during the flexing portion of the test. Then the tire sits for a prolonged period of time in a static condition which is reproduced in the 16 hour static portion of the cycle. The test results are expressed in kilocycles. During the flexing portion of the test, the samples are flexed through a 78° angle at about 8.5 kilocycles per hour.

TABLE III

DYNAMIC OZONE TESTING
(Results in Kilocycles)

| | EXAMPLE # | | |
|---|---|---|---|
| ANTIOZONANT, 4 PHR | 15 Blank | 16 Comparative A | 17 Example 1 |
| 8 HOUR FLEX/16 HOUR STATIC RESULTS IN KILOCYCLES | | | |
| Unaged | | | |
| No Cracks | | | |
| Cracked | 1694 | 8264 | 8584 |
| ¹6 Months Aged | | | |
| No Cracks | — | 13896* | 16588* |
| Cracked | 2969 | — | — |
| ¹12 Month Aged | | | |
| No.Crack | — | 7655* | 7655* |
| Cracked | 1165 | | |

¹Test ongoing
*Very, very slight cracking is visible

This dynamic flexing test uses rectangular specimens 12 mm by 76 mm with a 3 mm radius circular groove across the center of the specimen.

It is apparent from the results, that Example 15 which contained no antiozonant survived less than 3000 kilocycles under this test. Examples 16 and 17, which are protected by the paraphenylenediamine of the prior art and a triazine of this invention, respectively, exhibited very significant improvements in the ability to withstand the outdoor aging. The triazine compound of the invention protected the sample of Example 17 with very nearly the same result as the paraphenylenediamine of Comparative A, which is generally considered to be one of the best antiozonants available for dynamic applicants.

ANTIOZONANT BLENDING—EXAMPLES
18–21

The triazine compounds of the invention, when compared to

N-phenyl-N'-(1,3-dimethylbutyl)-p-phenylenediamine (Comparative A - Flexzone 7F) generally exhibit much better protection under static conditions and slightly poorer protection under severe dynamic conditions as judged by various laboratory test methods. However, it has been quite unexpectedly and surprisingly found that the dynamic protection properties may be greatly improved by blending the triazine compounds with conventional p-phenylene diamines. This is accomplished without sacrificing static condition ozone protection. Examples 18-21 below demonstrate this synergistic effect.

In Examples 18 and 19, the antiozonant of Example 1 was blended with two conventional antiozonants to evaluate the cumulative effect under both static and dynamic ozone testing conditions. The results were compared to unblended controls 20 and 21. The rubber formulation utilized was the same as the Test Formulation previously used in all test work except that the microcrystalline wax was deleted to assure that the antiozonant effect of the wax was not present to affect the results.

The Outdoor Dynamic Ozone test was conducted in a similar manner to the 8 hour flex/16 hour static test for Examples 12-14 of Table III except that the flexing at 8.5 kilocycles per hour is run continuously. There is no relaxation period. The test was ongoing, and therefore, no samples have yet reached the point of final cracking (failure).

The Ozone Box Static Test was run as described for Examples 9-11.

TABLE IV

| ANTIOZONANT BLEND TESTING | | | | |
|---|---|---|---|---|
| EXAMPLE # | 18 | 19 | 20 | 21 |
| ANTIOZONANT, PHR | | | | |
| Example 1 | 2.5 | 3.0 | — | 4.0 |
| Comparative A | — | 1.0 | 4.0 | — |
| Comparative B | 1.5 | — | — | — |
| OZONE BOX STATIC TEST (in hours) | | | | |
| No Cracks | 1016 | 1016 | — | 1016 |
| *VVS | — | — | — | — |
| Cracked | — | — | 216 | — |
| OUTDOOR DYNAMIC TEST Continuous Flexing (in kilocycles) | | | | |
| No Cracks | 14583** | 14583** | 14583** | — |
| *VVS | — | — | — | 4231 |
| Cracked | — | — | — | — |

*VVS - First appearance of very, very slight cracks
**Test still underway last reading at 14583 kilocycles.

The results shown in Table IV for the Ozone Box Static Test show that Comparative A (Flexzone 7F) cracks after 216 hours (Example 20) while the compound of Example 1, used in Examples 18, 19, 21 alone or in combination with Comparative A or B afforded excellent protection as indicated by the fact that no cracks were evident after 1016 hours.

The Outdoor Dynamic Test results of Examples 18-20 show that the blends of Example 1 with Comparative A and B showed excellent protection under dynamic conditions. The blends of Examples 18 and 19 unexpectedly improved the Dynamic Ozone resistance compared to Example 21 which used the compound of Example 1 alone.

NON-STAINING CHARACTERISTICS—EXAMPLES 22-24

Samples specimens were prepared using the test formulation set forth previously but without wax. The test formulation was compounded, mixed and cured into flat test sheets for subsequent analysis of discoloration and staining characteristics. The specific testing was conducted in accordance ASTM-D925-83 Method C. The Method C judges the degree of staining tendency of material by determining the amount of discoloration that occurs from the substrate material through a white lacquer coating which has been placed on the test sample. The test formulation previously set forth for all test samples of the invention was utilized. Once the test specimen was mixed and cured, it was coated with a veneer of white lacquer in accordance with the ASTM-D925 procedure. It was then exposed to a sunlamp light source in a suitable test chamber for a specified period of time. The Hunter Lab TM Colorimeter test apparatus was utilized to objectively determine the change in the color of the white lacquer during the four-hour exposure to the sun lamp. ASTM D2244-79 titled "Color Differences of Opaque Materials", reports a number of characteristics by the standard difference letters a, b, and L. Since the staining characteristics of normal antiozonants are very extreme, the L color scale is reported below. The L color scale is a scale from 0 to 100 with a 0 value being totally black and a 100 value being pure white. Therefore the higher the L value, the whiter the sample. The Test formulation of Example 22 was were prepared as a blank which contain no antiozonant. Example 24 contains the antiozonant of the invention described in Example 1, 2,4,6-tris(N-1,4-dimethylpentyl-p-phenylenediamino)-1,3,-5-triazine.

Example 23 uses the Comparative A material which is N-phenyl-N'-(1,3-dimethylbutyl)-p-phenylenediamine (Flexzone 7F, available from Uniroyal Chemical Company, Inc.). The test results of the three samples are presented below in Table V showing the Hunter "L" value after four hours of exposure.

TABLE V

| HUNTER "L" COLOR RESULTS | | |
|---|---|---|
| | EXAMPLE | |
| | 22 | 23 | 24 |
| ANTIOZONANT | blank | Comparative A | Example 1 |
| | 87.9 | 32.6 | 81.5 |

The results shown above clearly show that the conventional paraphenylenediamine material of Example 23 shows significant staining (32.6) after 4 hours of exposure. But by contrast the test formula containing the compound of the invention of Example 1 had a color value of 81.5 which is very close to 87.9 value reported for the blank of Example 22. Thus, the compound of the invention is shown to have minimal diffusion staining which is an extremely unusual result for stabilizer of the amine class. Thus, the compounds of the invention can be advantageously utilized as antiozonants without the normal accompanying problems of diffusion staining and severe discoloration such as that shown in Comparative A results above. This class of materials could be described as non-staining antiozonants.

The compounds of the invention may be used to good advantage with antioxidants and antiozonants of the prior art in blends to enhance particular properties. While the substituted triazine compounds of the invention have herein described only as antiozonants, it is clear that the materials may also function as antioxidants for rubber, thus providing protection against oxidative degradation as well as ozone protection. It is noted that when used as an antioxidant, the levels are typically much lower per hundred parts of rubber hydrocarbon than when antiozonant protection is required.

The 2,4,6-tris(N-alkyl-p-phenylenediamino)-1,3,5-triazines can be most advantageously used in a tire as a component of any or all of the thermosetting rubber-containing portions of the tire. These include the tread, sidewall and carcass portions of a truck, passenger or off-road vehicle tire which also contain many different reinforcing layers therein. These components typically contain more than one thermosetting rubber polymer in a blend which must be protected from ozone degration, as well as oxidative attack.

Methods of incorporating these compounds into the tire are conventional and well known. These compounds improve the scorch safety of the rubber stock in which they are incorporated compared to conventional paraphenylenediamines.

Unsaturated polymers may be optionally protected against both oxidative and ozone degradation by blending the triazine compounds of the invention with conventional antioxidants. Many classes of phenolics, amines, etc. function as antioxidants. The Index of Commercial Antioxidants and Antiozonants, 3rd Edition published by The Goodyear Tire and Rubber Company lists materials commonly viewed as materials having antioxidant properties, and is incorporated herein by reference. Representative classes of such antioxidant materials are sterically hindered phenols, alkyl-substituted diphenylamines, aryl-substituted diphenylamines, aralkyl-substituted diphenylamines, naphthylamines, reaction products of a diarylamine and a ketone, mono-phenols, bisphenols, polyphenols, hydroquinone derivatives, and polymerized quinolines. The antioxidant system may contain one or more of these materials. Optimal levels of addition (PHR) for the antioxidants can be easily determined through routine experimentation and may vary widely depending upon the end use application.

In view of the many changes and modifications that may be made without departing from principles underlying the invention, reference should be made to the appended claims for an understanding of the scope of the protection afforded the invention.

What is claimed is:

1. A compound of the general formula:

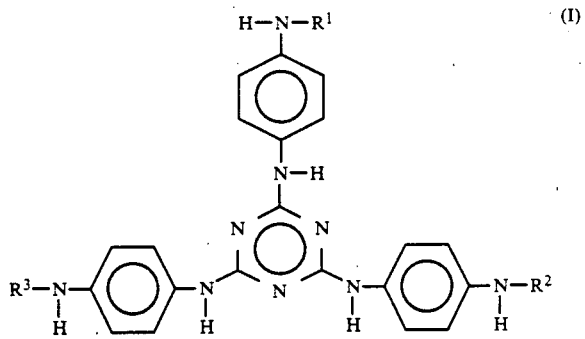

in which $R^1$, $R^2$ and $R^3$ are radicals independently selected from a $C_3$-$C_{18}$ branched or linear alkyl, or a $C_3$-$C_{12}$ cycloalkyl or a $C_3$-$C_{12}$ cycloalkyl substituted with one or more $C_1$-$C_{12}$ alkyl groups.

2. A compound according to claim 1 wherein said $R^1$, $R^2$ and $R^3$ are the same radicals.

3. A compound according to claim 1 wherein $R^1$, $R^2$ and $R^3$ are the same radical selected from $C_3$-$C_{18}$ branched alkyl radicals.

4. A compound according to claim 3 wherein $R^1$, $R^2$ and $R^3$ are $C_6$-$C_8$ secondary alkyl radicals.

5. A compound according to claim 1 wherein the radicals have a secondary carbon atom in the alpha position relative to the nitrogen.

6. A compound according to claim 2 wherein $R^1$, $R^2$, and $R^3$ are 1,4-dimethylpentyl radicals.

7. A 2,4,6-tris(N-alkyl-p-phenylenediamino)-1,3,-5-triazine compound in which the alkyl radical is selected from a $C_3$-$C_{18}$ branched or linear alkyl, or a $C_3$-$C_{12}$ cycloalkyl or a $C_3$-$C_{12}$ cycloalkyl substituted with one or more $C_1$-$C_{12}$ alkyl groups.

8. The compound according to claim 7 wherein the alkyl is selected from the group consisting of 1,4-dimethylpentyl; isopropyl; cyclohexyl; sec-butyl: 1,3-dimethylbutyl; 1-methylheptyl; 2,4-di-t-butylcyclohexyl; 2-sec-butylcyclohexyl; and 1-methyldecyl.

9. The compound according to claim 7 wherein the alkyl is 1,4-dimethylpentyl.

10. The compound according to claim 7 wherein said compound is 2,4,6-tris-(N-1,4-dimethylpentyl-p-phenylenediamino)-1,3,5-triazine.

11. The compound according to claim 7 wherein said compound is 2,4,6-tris(N-1,3-diemthylbutyl-p-phenylenediamino)-1,3,5-triazine.

12. The compound according to claim 7 wherein said compound is 2,4,5-tris(N-1-methylheptyl-p-phenylenediamino)-1,3,5-triazine.

13. The compound according to claim 7 wherein said compound is 2,4,5-tris(N-sec-butyl-p-phenylenediamino)-1,3,5-triazine.

* * * * *

UNITED STATES PATENT AND TRADEMARK OFFICE
CERTIFICATE OF CORRECTION

PATENT NO. : 5,047,530

DATED : Sep. 10, 1991

INVENTOR(S) : Edward L. Wheeler, et al.

It is certified that error appears in the above-identified patent and that said Letters Patent is hereby corrected as shown below:

Column 5, line 29, change "phenplenediamino" to --phenylenediamino--.

Column 5, line 61, change "phenplenediamino" to --phenylenediamino--.

Signed and Sealed this

Second Day of February, 1993

Attest:

STEPHEN G. KUNIN

Attesting Officer

Acting Commissioner of Patents and Trademarks